(12) United States Patent
Skala

(10) Patent No.: US 7,491,455 B2
(45) Date of Patent: Feb. 17, 2009

(54) METHOD TO STARTUP A FUEL CELL STACK WITHOUT BATTERY DERIVED COMPRESSOR POWER

(75) Inventor: Glenn W Skala, Churchville, NY (US)

(73) Assignee: General Motors Corporation, Detroit, MI (US)

( * ) Notice: Subject to any disclaimer, the term of this patent is extended or adjusted under 35 U.S.C. 154(b) by 673 days.

(21) Appl. No.: 10/760,961

(22) Filed: Jan. 20, 2004

(65) Prior Publication Data

US 2005/0158601 A1 Jul. 21, 2005

(51) Int. Cl.
*H01M 8/04* (2006.01)
(52) U.S. Cl. .......................... 429/17; 429/13
(58) Field of Classification Search .................. 429/13, 429/17
See application file for complete search history.

(56) References Cited

U.S. PATENT DOCUMENTS

| | | | |
|---|---|---|---|
| 6,218,038 B1* | 4/2001 | Oko et al. | 429/34 |
| 6,514,635 B2* | 2/2003 | Van Dine et al. | 429/17 |
| 6,534,210 B2* | 3/2003 | Luken et al. | 429/13 |
| 6,616,424 B2* | 9/2003 | Raiser | 417/411 |
| 2005/0186454 A1* | 8/2005 | Clingerman et al. | 429/13 |

* cited by examiner

*Primary Examiner*—Mark Ruthkosky

(57) ABSTRACT

A method of providing fuel cell start-up without battery derived compressor power is provided. The method includes introducing hydrogen to the anode inlet of a fuel cell stack previously purged with air. The introduced hydrogen in the anode channels and the existing air in the cathode channels generate a small amount of voltage to begin to drive the air compressor. As additional air is introduced into the cathode channels by the slowly starting compressor, the fuel cell stack produces more voltage until the system is producing sufficient net power to operate under normal run control conditions.

11 Claims, 2 Drawing Sheets

METHOD TO STARTUP A FUEL CELL STACK WITHOUT BATTERY DERIVED COMPRESSOR POWER

FIELD OF THE INVENTION

The present invention relates to a fuel cell system, and more particularly, to a method to start up a fuel cell stack without battery derived compressor power.

BACKGROUND OF THE INVENTION

Fuel cells have been used as a power source in many applications. For example, fuel cells have been proposed for use in electrical vehicular power plants to replace internal combustion engines. In proton exchange membrane (PEM) type fuel cells, hydrogen is supplied to the anode of the fuel cell, and oxygen is supplied to the cathode. PEM fuel cells include a membrane electrode assembly (MEA) comprising a thin, proton transmissive, non-electrically conductive solid polymer electrolyte membrane having the anode catalyst on one of its faces and the cathode catalyst on the opposite face. The MEA is sandwiched between a pair of electrically conductive elements which serve as current collectors for the anode and cathode, and contain appropriate channels and/or openings therein for distributing the fuel cells gaseous reactants over the surfaces of the respective anode and cathode catalyst. A typical PEM fuel cell and its membrane electrode assembly (MEA) are described in U.S. Pat. Nos. 5,272,017 and 5,316,871 issued respectively Dec. 21, 1993 and May 31, 1994 and assigned to General Motors Corporation.

The term "fuel cell" is typically used to refer to either a single cell or a plurality of cells depending on the context. A plurality of individual cells are commonly bundled together to form a fuel cell stack. Each cell within the stack comprises the MEA described earlier, and each such MEA provides its increment of voltage. Typical arrangements of multiple cells in a stack are described in U.S. Pat. No. 5,763,113 assigned to General Motors Corporation, and which is herein incorporated by reference.

During fuel cell system start-up, a compressor is often utilized to provide compressed air or oxygen to the fuel cell cathode inlet while hydrogen is introduced to the fuel cell anode inlet. Many fuel cell systems currently use large battery packs to start and operate the compressor before output power is available from the fuel cell stack. The battery pack often is utilized with various DC/DC converters to provide the high voltage necessary for the compressor. Usually, a DC/DC converter is needed to get the battery voltage up to the stack level, then another DC/DC converter is needed to get the voltage from the stack level up to the compressor motor controller level. The large battery pack and DC/DC converters contribute significantly to the weight, volume, and cost of the fuel cell system. Thus, it is desirable to provide a simplification of the fuel cell system as well as reducing the mass volume and cost of the system.

SUMMARY OF THE INVENTION

Accordingly, the present invention is provided to simplifying the starting of a fuel cell system without using any battery-derived high voltage power to drive the compressor. When a fuel cell stack is shut down, one means of dealing with the water in the stack is to purge both the cathode and anode sides of the stack with air. Once the purge process is completed, air is left in both the anode and cathode manifolds and flow channels. This purge process is typically utilized in order to address a freezing environment. Since the stack manifolds and flow channels are full of air at start-up, the present invention provides for hydrogen to be fed into the anode inlet of the fuel cell stack such that the fuel cell stack is able to produce power at low levels for a period of time by utilizing the existing air in the cathode flow channels of the fuel cell stack in combination with the hydrogen which is fed to the anode inlet. The power provided from the fuel cell stack is sufficient to slowly start the compressor motor and to get the compressor to move more air into the cathode side of the stack so that the load on the stack due to the compressor can be increased gradually until the system is producing sufficient net power to operate under normal run control conditions.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
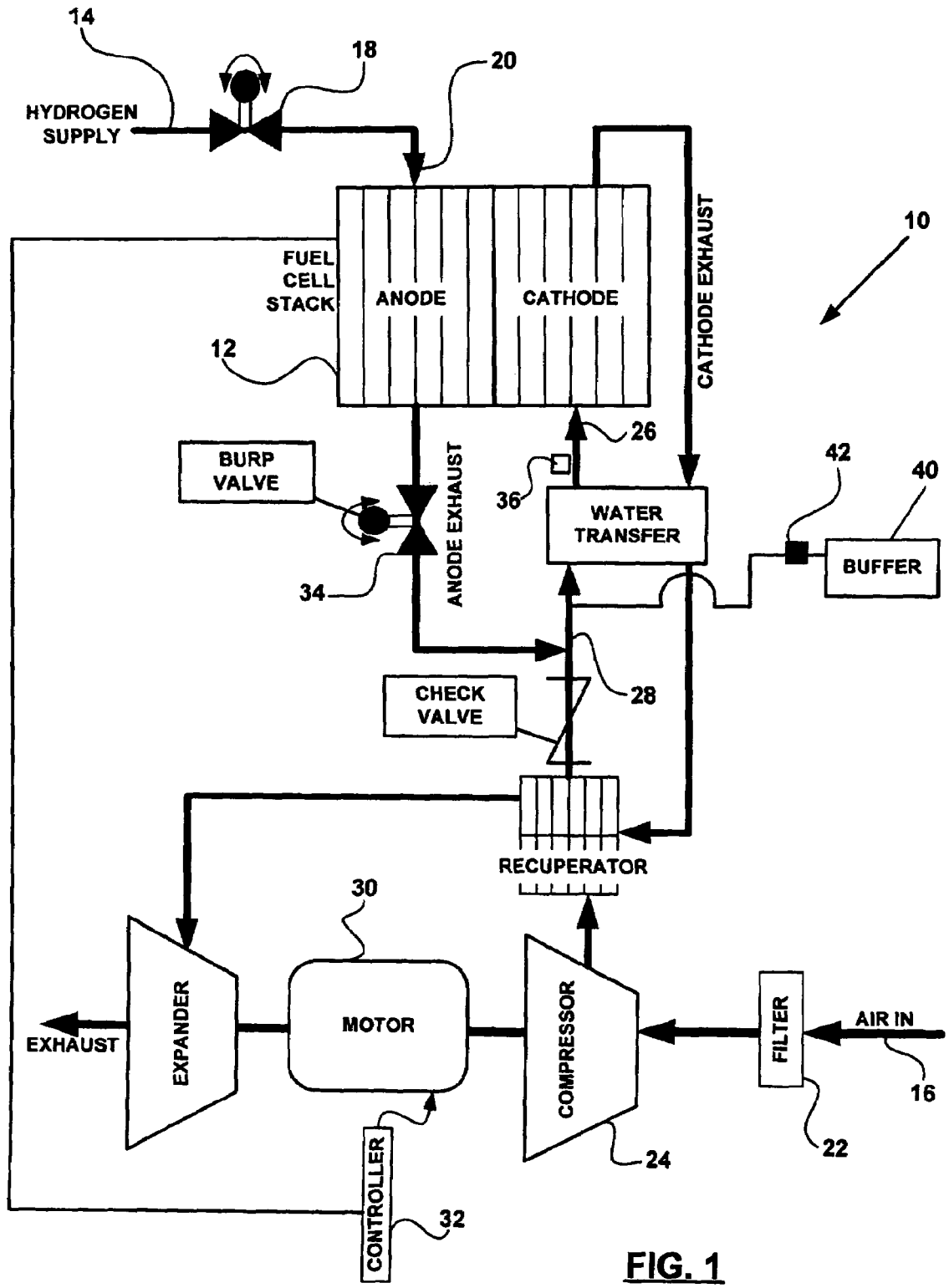
FIG. 1 is a schematic view of a fuel cell system capable of providing fuel cell start-up without battery derived compressor power according to the principles of the present invention.

The following description of the preferred embodiment(s) is merely exemplary in nature and is in no way intended to limit the invention, its application, or uses.

The present invention is directed to a fuel cell system 10, in particular a fuel cell system whereby start-up of the fuel cell stack can be performed without battery derived compressor power. The fuel cell system 10 includes a fuel cell stack 12 which is connected to a hydrogen source 14 and an oxygen source 16, as are well known in the art. In overview, the fuel cell stack 12 includes a plurality of membrane electrode assemblies each disposed between a plurality of bipolar plates. As is known in the art, the stack may also include a plurality of gas distribution layers, a plurality of anode manifolds, a plurality of cathode manifolds, a plurality of coolant manifolds, and upper and lower end plates, all arranged in a stacked relation. The sequence of MEAs and bipolar plates is repeated to provide the desired voltage output for the fuel cell stack 12. As is known in the art, each MEA includes a membrane in the form of a thin proton transmissive non-electrically conductive solid polymer electrolyte. An anode catalyst layer is provided on one surface of the membrane and a cathode catalyst layer is provided on the opposite surface of the membranes. For purposes of the present invention, the configuration of the fuel cell stack 12 can be of any known arrangement.

The hydrogen supply 14 can include a fuel processor or stored hydrogen, as is known in the art. A hydrogen supply valve 18 (either manual or electronic solenoid controlled) is provided in communication with the hydrogen supply 14 for providing hydrogen to the anode inlet 20 of the fuel cell stack 12.

Oxygen in the form of air or pure oxygen is supplied to the fuel cell system 10 by an oxygen supply 16 which is optionally provided with a filter 22 and is in communication with a compressor 24 which delivers the oxygen supply to the cathode inlet 26 of the fuel cell stack 12 via a cathode gas passage 28. The compressor 24 is driven by a motor 30 which is supplied with electrical power from the fuel cell stack 12. A controller 32 is provided for controlling operation of the motor as well as sensing the voltage level of the cells of the fuel cell stack 12.

The method of the present invention provides for starting of the fuel cell system without using any battery-derived high voltage power to drive the compressor 24. Since the stack manifolds and flow channels were purged with air during the previous shut down, the anode and cathode flow channels and manifold are full of air. According to the method of the present invention, hydrogen is supplied to the anode inlet 20 by opening valve 18 to allow hydrogen from the hydrogen supply 14 to flow into the anode flow channels. The hydrogen in the anode flow channels and the existing air in the cathode flow channels provide a small amount of electrical power to be generated by the fuel cell stack 12.

As the controller 32 determines that the electrical power is being generated by the fuel cell stack 12, the motor 30 is commanded to apply a load on the fuel cell stack 12 that slowly begins to drive the compressor 24, in order to provide additional air to the cathode flow channels of the fuel cell stack 12. The load tied to the fuel cell stack 12 is then gradually increased by increasing the load of the motor 30 until the system is producing sufficient new power to operate under normal operating conditions.

Figure 2:
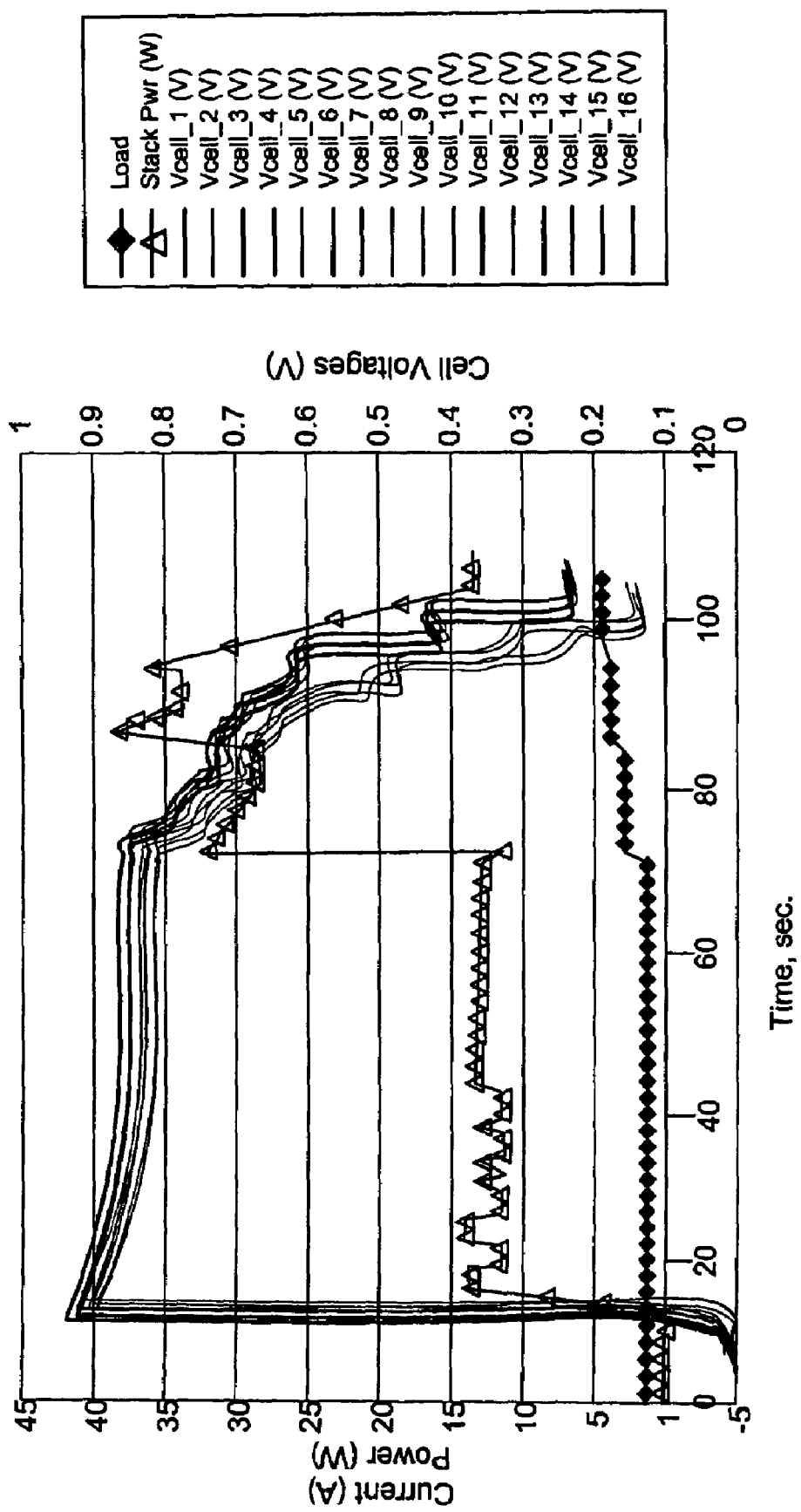
FIG. 2 is a graphical illustration of the cell voltages generated with no cathode flow according to the principles of the present invention.

FIG. 2 illustrates the cell voltages generated in a fuel cell stack that has been purged on both sides and has hydrogen introduced to the anode flow channels with no cathode flow. The graphical illustration illustrates that for a 16 cell stack, sufficient power can be generated over a time period necessary to start the system compressor. Accordingly, at start-up, the only power needed would be to activate the system controller 32 and to actuate the hydrogen control valve 18 and anode burp valve 34.

Control of the fuel cell system 10 during start up can be handled in alternative ways. One method would be to use the controller 32 to monitor the cell voltages and command the compressor motor 30 to load the fuel cell stack 12 in a way to keep the cell voltages at reasonable levels. As the compressor 24 begins to flow air, as detected by a signal from an airflow sensor or manifold pressure sensor 36, more hydrogen can be commanded via further opening of the valve 18 and more compressor load can be applied. A snowballing effect allows the system to ramp up to a positive net power condition. As soon as the system is capable of providing positive net power, the controller 32 can switch to a run control mode to take over operation of the fuel cell system 10.

Another alternative method would be to characterize the starting behavior of the fuel cell stack 12 and compressor 24 to a point where the commanded hydrogen flow and commanded compressor power can be handled on an open loop basis. In other words, the introduction of hydrogen and the associated load applied to the compressor motor 30 can be characterized to a time schedule so that during start-up, the introduction of hydrogen supply to the anode inlet 20 and control of the compressor motor 30 can be controlled according to a computer implemented (or dedicated circuit controlled) time schedule in order to achieve system start-up. In this scenario, the cell voltage monitoring would not be needed.

Another possible start-up control method provides a small air (or oxygen) buffer 40 or source that would be released into the stack cathode inlet passage 28 at start-up. The buffer 40 is preferably pressurized by a previous compressor run via a check valve 42 arrangement that captures a maximum pressure or alternatively by an electrolyzer that discharges oxygen into a small tank. The small oxygen tank 40 can be provided at one-fifth the size of an equivalent air buffer since the oxygen is stored in a more pure state.

Yet another alternative method of fuel system start-up involves the use of effluent from the burp valve 34 being introduced into the cathode inlet stream 28 to cause the volume of air contained in the manifolds and plumbing upstream of the cathode inlet 26 (from the previous shutdown) to be forced through the cathode flow channels of the fuel cell stack 12 increasing the compressor-free operation period significantly.

The system of the present invention provides a method of starting a fuel cell stack with no available external power for driving the compressor. Manual operation of the hydrogen supply valve 18 releases sufficient hydrogen flow to produce voltage in the stack which provides power to the control system. Once the control system is functional, the manual valve can be released and automatic control can take over according to one of the above operations.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of fuel cell start-up for a fuel cell system having a hydrogen source connected to an anode inlet of a fuel cell stack and an oxygen source connected to a cathode inlet of the fuel cell stack, the cathode inlet being connected to a compressor, the method comprising the steps of:
    purging hydrogen from the fuel cell stack with air prior to startup;
    starting the fuel cell system by re-introducing said hydrogen to the anode inlet of the fuel cell stack, said hydrogen reacting with said air to generate an initial amount of electrical power;
    determining said initial amount of electrical power generated by the fuel cell stack with an electronic controller;
    applying an electrical load to the fuel cell stack via the compressor for supplying oxygen to the cathode inlet based on said initial amount of electrical power of the fuel cell stack; and
    gradually increasing said electrical load on the fuel cell stack over time while using increased electrical power generated to drive the compressor to supply additional oxygen to the cathode inlet.

2. The method according to claim 1, wherein said step of introducing hydrogen to the anode inlet includes opening a valve to release hydrogen flow to the anode inlet.

3. The method according to claim 2, wherein said valve is opened manually.

4. The method according to claim 2, wherein said valve is opened by an electronic solenoid.

5. The method according to claim 1, wherein said step of gradually increasing said electrical load on the fuel cell stack is performed by said electronic controller.

6. The method according to claim 1, wherein said step of gradually increasing said electrical load to the fuel cell stack is performed until the fuel cell stack produces enough electrical power to operate at a positive net power.

7. The method according to claim 1, wherein said step of gradually increasing said electrical load to the fuel cell stack is performed on an open loop basis according to a predetermined time schedule.

8. The method according to claim 1, further comprising said step of releasing a stored oxygen source into the cathode inlet after said step of introducing hydrogen to the anode inlet.

9. The method according to claim 1, further comprising said step of releasing a pressurized gas into a passage upstream of the cathode inlet for forcing oxygen in said passage into said fuel cell stack.

10. The method according to claim 9, wherein said pressurized gas is provided from a burp valve provided in an anode exhaust passage of the fuel cell stack.

11. The method according to claim 5, wherein said electronic controller monitors cell voltages of the fuel cell stack and commands a compressor motor to load the fuel cell stack and to increase said load on the fuel cell stack as said cell voltages of the fuel cell stack increase.

* * * * *